United States Patent
Salter et al.

(10) Patent No.: US 9,340,152 B2
(45) Date of Patent: May 17, 2016

(54) PHOTOLUMINESCENT SCUFF PLATE AND GRAB HANDLE

(71) Applicant: Ford Global Technologies, LLC, Dearborn, MI (US)

(72) Inventors: Stuart C. Salter, White Lake, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 14/451,801

(22) Filed: Aug. 5, 2014

(65) Prior Publication Data

US 2015/0138800 A1    May 21, 2015

Related U.S. Application Data

(63) Continuation-in-part of application No. 14/086,442, filed on Nov. 21, 2013.

(51) Int. Cl.
*F21V 11/00* (2015.01)
*B60Q 3/02* (2006.01)
*B60Q 3/00* (2006.01)

(52) U.S. Cl.
CPC .............. *B60Q 3/0233* (2013.01); *B60Q 3/008* (2013.01); *B60Q 3/0216* (2013.01)

(58) Field of Classification Search
CPC ........ B60Q 3/008; B60Q 3/02; B60Q 3/0203; B60Q 3/0209; B60Q 3/0216; B60Q 3/0233
USPC .......................................... 362/488, 501, 510
See application file for complete search history.

(56) References Cited

U.S. PATENT DOCUMENTS

| | | | |
|---|---|---|---|
| 5,396,740 A | 3/1995 | Bocchi | |
| 6,135,621 A | 10/2000 | Bach et al. | |
| 6,553,629 B2 | 4/2003 | Grady et al. | |
| 2004/0128882 A1 | 7/2004 | Glass | |
| 2009/0251920 A1 | 10/2009 | Kino et al. | |

*Primary Examiner* — Jason Moon Han
(74) *Attorney, Agent, or Firm* — Vichit Chea; Price Heneveld LLP

(57) ABSTRACT

A lighting system for a vehicle is provided. The system includes at least one light source configured to output a first light at a first wavelength. The system also includes a first photoluminescent material coupled to a first doorway structure, wherein the first photoluminescent material is configured to convert the first light into a second light characterized by a second wavelength.

19 Claims, 4 Drawing Sheets

PHOTOLUMINESCENT SCUFF PLATE AND GRAB HANDLE

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offer a unique and attractive viewing experience. It is therefore desired to implement such structures in automotive vehicles for various lighting applications.

SUMMARY OF THE INVENTION

According to one aspect of the present invention, a lighting system for a vehicle is provided. The system includes at least one light source configured to output a first light at a first wavelength. The system also includes a first photoluminescent material coupled to a first doorway structure, wherein the first photoluminescent material is configured to convert the first light into a second light characterized by a second wavelength.

According to another aspect of the present invention, a lighting system for a vehicle is provided. The system includes a first photoluminescent material coupled to a doorway structure. The system also includes a grab handle having an integrated light source that is configured to output a first light at a first wavelength, wherein a first portion of the first light is directed towards the first photoluminescent material, which is configured to convert the first light into a second light characterized by a second wavelength.

According to yet another aspect of the present invention, a lighting system for a vehicle is provided. The system includes a grab handle and a light source integrated with the grab handle. The system also includes a first photoluminescent material coupled to a scuff plate and configured to down convert light received from the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle. The lighting system advantageously employs one or more photoluminescent structures configured to convert light received from an associated light source and re-emit the light at a different wavelength typically found in the visible spectrum. The converted light outputted from the photoluminescent structure(s) may function as task, ambient, and/or accent lighting. While the various implementations of the lighting system described herein refer to specific structures demonstrated in reference to at least one automotive vehicle, it will be appreciated that the vehicle lighting system may be utilized in a variety of applications.

Figure 1A:
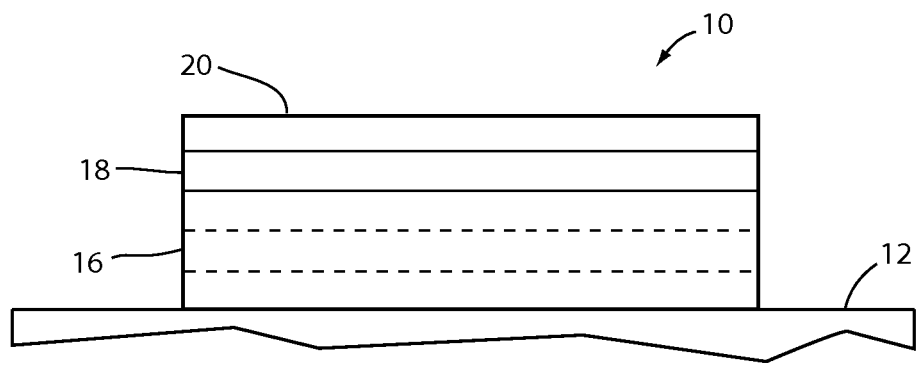
FIG. 1A illustrates a photoluminescent structure coupled to a vehicle fixture, according to one embodiment.
Figure 1B:
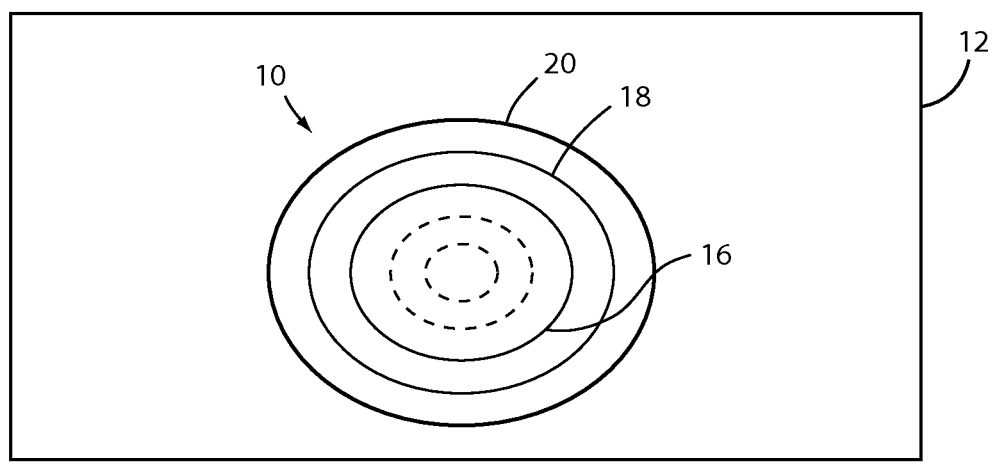
FIG. 1B illustrates a photoluminescent structure coupled to a vehicle fixture, according to another embodiment.
Figure 1C:
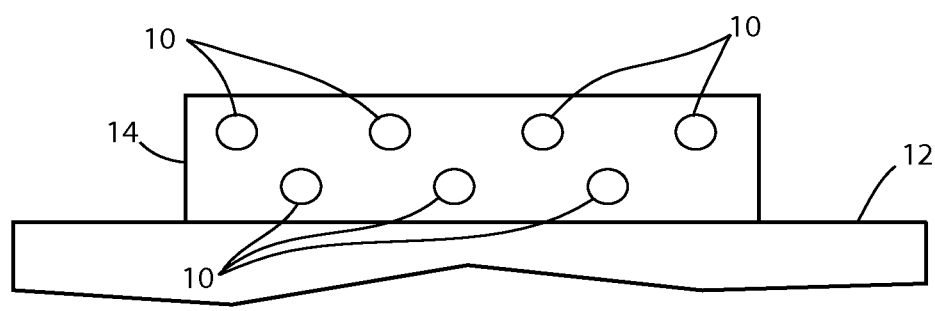
FIG. 1C illustrates a photoluminescent structure coupled to a vehicle fixture, according to yet another embodiment.

Referring to FIGS. 1A-1C, various exemplary embodiments of a photoluminescent structure 10 are shown, each capable of being coupled to a vehicle fixture 12. In FIG. 1A, the photoluminescent structure 10 is generally shown rendered as a coating (e.g. a film) that may be applied to a surface of the vehicle fixture 12. In FIG. 1B, the photoluminescent structure 10 is generally shown as a discrete particle capable of being integrated with a vehicle fixture 12. In FIG. 1C, the photoluminescent structure 10 is generally shown as a plurality of discrete particles that may be incorporated into a support medium 14 (e.g. a film) that may then be applied (as shown) or integrated to the vehicle fixture 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the light is converted into a longer wavelength light, which may then be outputted from the photoluminescent structure 10 and/or used to excite other photoluminescent material(s)

found in the energy conversion layer 16. Conversely, under the principle of up conversion, the light is converted into a shorter wavelength light, which may also be outputted from the photoluminescent structure 10 and/or used to excite other photoluminescent material(s) found in the energy conversion layer 16. The process of using converted light outputted from one photoluminescent material to excite another, and so on, is generally known as an energy cascade. With respect to either conversion principle, the difference in wavelength between the light that excites and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired vehicle fixture. The energy conversion layer 16 may be applied to a vehicle fixture by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a vehicle fixture using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 2A:
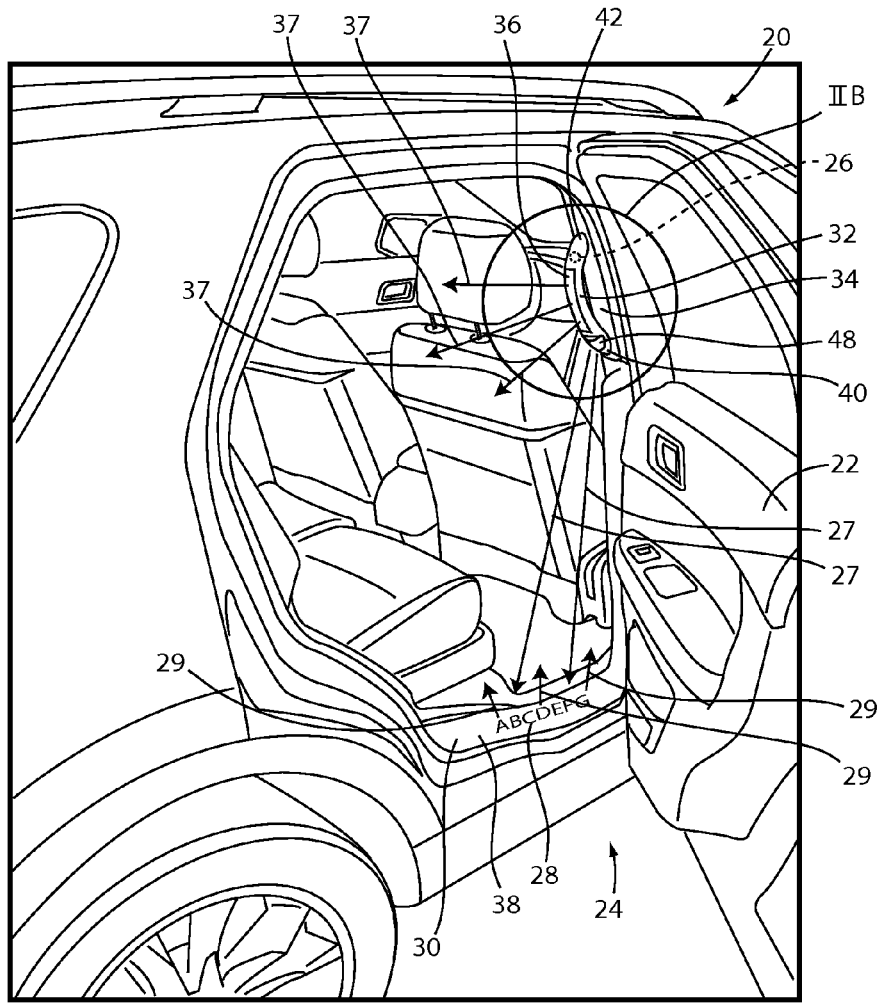
FIG. 2A illustrates a lighting system for a vehicle utilizing photoluminescent structures.
Figure 2B:
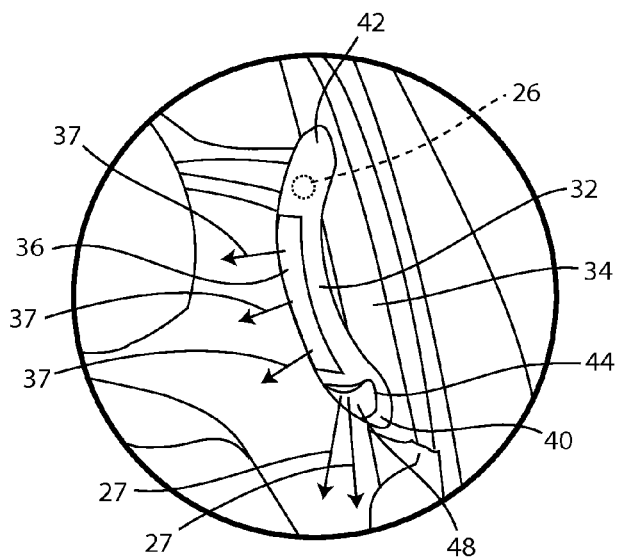
FIG. 2B is a magnified view of a photoluminescent structure coupled to a handle.

Referring to FIGS. 2A and 2B, a vehicle 20 is shown having a passenger door 22 shown in an open position. The vehicle 20 is equipped with a lighting system 24 that includes a light source 26 configured to output a first light 27 at a first wavelength. The lighting system 24 also includes a first photoluminescent structure 28 coupled to a doorway structure 30, wherein the first photoluminescent structure 28 is configured to convert the first light 27 into a second light 29 characterized by a second wavelength. The light source 26 may be integrated with a grab handle 32 that is coupled to a pillar 34 of the vehicle 20. The lighting system 24 may further include a second photoluminescent structure 36 coupled to the grab handle 32 and configured to convert the first light 27 into a third light 37 characterized by a third wavelength. With respect to the implementations described herein, the first photoluminescent structure 28 and the second photoluminescent structure 36 may be constructed according to any of the photoluminescent structures 10 shown in FIGS. 1A-1C, but are not necessarily limited thereto. While the lighting system 24 is shown in FIG. 2A as being implemented in the doorway of passenger door 22, it should be appreciated that the lighting system 24 may be similarly implemented in all other doorways of the vehicle 20

The first photoluminescent structure 28 may be formed as a text, exemplarily shown in FIG. 2A as "abcdefg" and may be molded into the doorway structure 30, applied onto the doorway structure 30, or otherwise coupled to the doorway structure 30 via other suitable means. For purposes of illustration, the doorway structure 30 is generally shown in FIG. 2A as a scuff plate 38 and may additionally or alternatively include any doorway structure found in the bottom entryway, side entryway, or top entryway of a vehicle door, such as passenger door 22. While the first photoluminescent structure 28 is shown in FIG. 2A as having a text configuration, it is to be understood that the photoluminescent structure 28 may additionally or alternatively be formed as an icon, pictogram, graphic, badge, the like, or a combination thereof and may occupy only a portion of the doorway structure 30 or the entirety thereof.

The light source 26 may be integrated with any doorway structure, including the scuff plate 38. However, due to space limitations and the labor costs imposed by locating the light source 26 within the scuff plate 38, it may be advantageous to provide the light source 26 in a remote location. According to one implementation, the light source 26 may be provided within the grab handle 32, which helps to protect and conceal the light source 26.

The grab handle 32 may have a generally opaque appearance and may be disposed vertically along an upper extent of the pillar 34, which is exemplarily shown in FIGS. 2A and 2B as the B-pillar of the driver side of the vehicle 20. The grab handle 32 may be connected to the pillar 34 via a bottom connecting end 40 and a top connecting end 42. Each connecting end 40, 42 may be secured to the pillar 34 using mechanical fasteners or other suitable means. The grab handle 32 may have a curved configuration or other configuration that enables an occupant who is entering or exiting the vehicle 20 to easily grab and hold onto the grab handle 32 when attempting to clear the doorway.

The light source 26 may be provided within the top connecting end 42 of the grab handle 32 and may be oriented to output the first light 27 through the grab handle 32. The grab handle 32 may be configured to internally reflect the first light 27 towards an opening 44 formed in the bottom connecting end 40 and may include a light penetrable region 46 that is combined with the second photoluminescent structure 36. In such a configuration, a portion of the first light 27 is directed through the grab handle 32 towards the opening 44 and another portion of the first light 27 is transmitted through the light penetrable region 46 and is converted into the third light 37 by the second photoluminescent structure 36. The third light 37 is then outputted from the second photoluminescent structure 36, thereby providing the grab handle 32 with accent lighting that is characterized by the color of the third light 37.

The portion of first light 27 reaching the opening 44 may be directed towards the first photoluminescent structure 28 by an optical element 48 coupled to the opening 44. The optical element 48 can be configured to focus the first light 27 on a relatively small area or distribute the first light 27 to cover a much larger area depending on the size of the first photoluminescent structure 28. Once received by the first photoluminescent structure 28, the first light 27 is converted into the second light 29. The second light 29 is then outputted from the first photoluminescent structure 28, thereby providing the scuff plate 38 with accent lighting that is characterized by the color of the second light 29.

The dimensions of the light penetrable region 46 and corresponding second photoluminescent structure 36 may be chosen such that a substantial amount of the first light 27 reaches the opening 44. This helps to ensure adequate illumination of the first photoluminescent structure 28 given its distance from the light source 26 in relation to the distance between the light source 26 and the second photoluminescent structure 36. For example, according to one implementation, the light penetrable region 46 may be configured as a narrow strip extending vertically along a length of the grab handle 32. It should be appreciated however, that the light penetrable region 46 and the corresponding second photoluminescent structure 36 may each be configured as a different shape or pattern, as well as a text, icon, pictogram, graphic, badge, the like, or a combination thereof.

Figure 3:
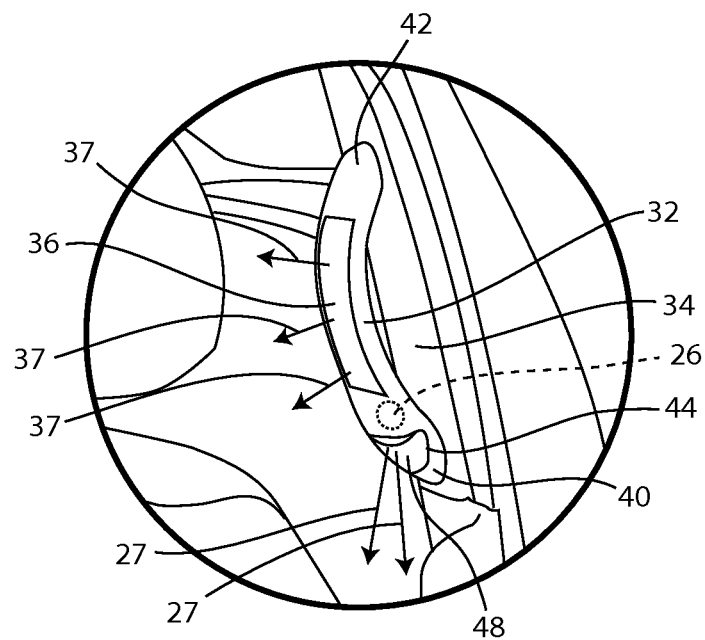
FIG. 3 is an alternative embodiment of the handle shown in FIG. 2B.
Figure 4:
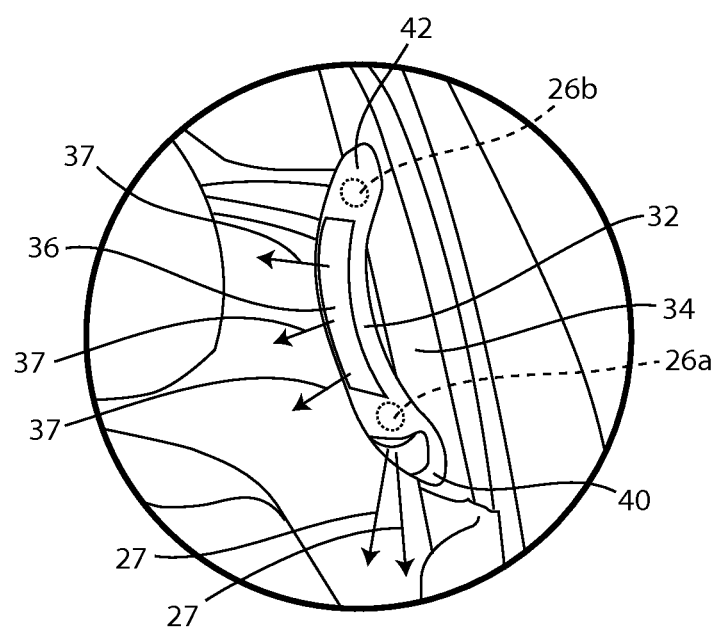
FIG. 4 is another alternative embodiment of the handle shown in FIG. 2B.

Referring to FIGS. 3 and 4, two alternative embodiments of the grab handle 32 are shown. In FIG. 3, the light source 26 is provided in the bottom connecting end 40 and is oriented such that a portion of the first light 27 is received by the optical element 48 and outputted therefrom towards the first photoluminescent structure 28 while another portion of the first light 27 is reflected upwards through the grab handle 32 and supplied to the second photoluminescent structure 36. In FIG. 4, a first light source 26a is provided in the bottom connecting end 40 and a second light source 26b is provided in the top connecting end 42. The first light source 26a and the second light source 26b may each be configured to output the first light 27. The first light source 26a may be oriented such that the entirety of the first light 27 is received by the optical element 48 and outputted therefrom towards the first photoluminescent structure 28. Similarly, the first light 27 outputted from the second light source 26b may be supplied exclusively to the second photoluminescent structure 36.

Figure 5:
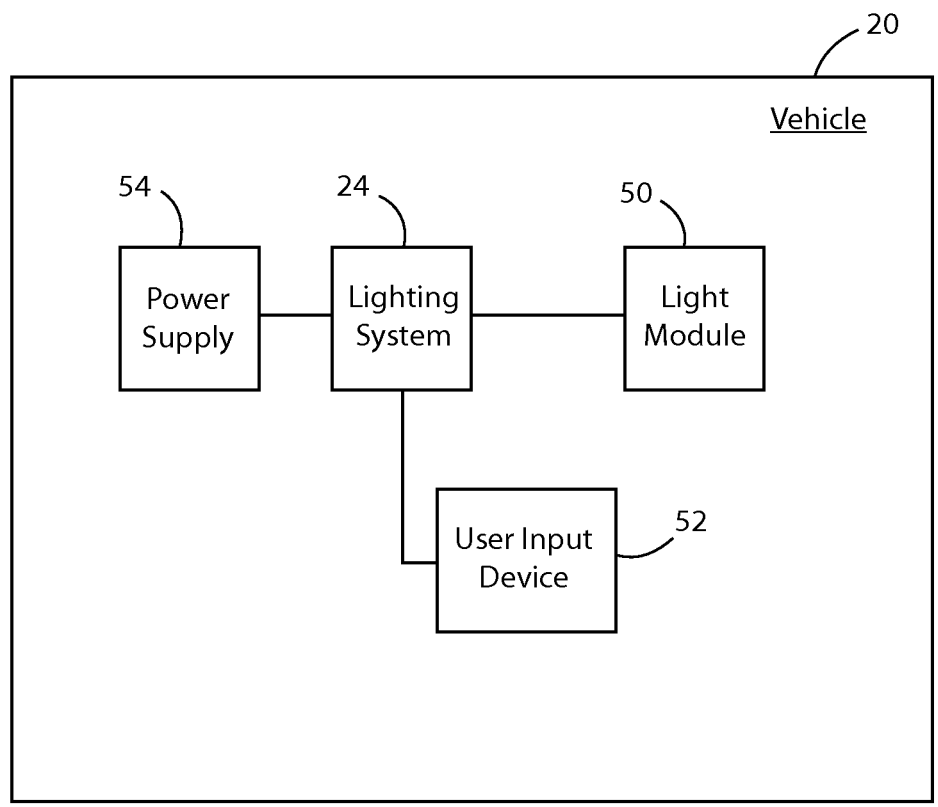
FIG. 5 is a block diagram of a lighting system being featured in a vehicle.

Referring to FIG. 5, the lighting system 24 may be controlled by one or more lighting modules 50 incorporated in the vehicle 20. The lighting module 50 may be configured to selectively activate any of the light sources 26, 26a, 26b described herein in response to the passenger door 22 being oriented in the open position. Additionally or alternatively, the lighting system 24 may be manually controlled through a user input device 52 located on-board the vehicle 20. Each of the light sources 26, 26a, 26b described herein with respect to FIGS. 2-4 may include any form of light source, such as, but not limited to, halogen lighting, fluorescent lighting, light emitting diodes (LEDs), organic LEDs (OLEDs), polymer LEDs (PLEDs), and solid state lighting and may be powered via a power supply 54 located on-board the vehicle 20.

According to one implementation, each of the light sources 26, 26a, 26b described herein may be configured to output the first light 27 at a first wavelength associated with a blue region of a light spectrum or an ultraviolet (UV) region of the light spectrum. Said differently, each of the light sources 26, 26a, 26b may be configured to output either a blue colored light or an ultraviolet colored light. Since blue colored light and ultraviolet colored light are less perceptible to the human eye, the first light 27 may be outputted towards the first photoluminescent structure 28 without being visibly obvious to an occupant who is entering or exiting the vehicle 20. The first photoluminescent structure 28 may be configured to down convert the first light 27 to produce a second light 29 having a longer wavelength than the first light 27. Similarly, the second photoluminescent structure 36 may also be configured to down convert the first light 27 to produce a third light 37 having a longer wavelength than the first light 27.

The second light 29 and the third light 37 may have the same or different wavelengths and may be expressed as visible light. This generally includes any color defined by an RGB color scale, including white light. It should be appreciated that the first photoluminescent structure 28 and the second photoluminescent structure 36 may have different formulations of photoluminescent materials in their respective energy conversion layers 16 and may each contain one or more distinct photoluminescent materials to produce a variety of color expressions. In this way, the lighting system 24 may be configured to provide accent lighting to the scuff plate 38 and the grab handle 32 using a limited number of light sources. By limiting the number of light sources required to provide the lighting discussed herein, the disclosure provides for a cost-effective method for delivering lighting to the vehicle 20.

The lighting system as described herein may provide various benefits including a cost-effective system operable to provide accent lighting to a doorway structure and a grab handle of a vehicle. The various implementations described herein including the particular locations and configurations of each of the photoluminescent portions may vary without departing from the spirit of the disclosure. The subject matter of the instant disclosure provides various lighting systems and methods that may improve the appearance of a vehicle and improve vehicle safety by illuminating a surface beneath the vehicle proximate a passenger door.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting system for a vehicle, comprising:
   at least one light source configured to output a first light at a first wavelength; and
   a first photoluminescent structure coupled to a first doorway structure, wherein the first photoluminescent structure is configured to convert the first light into a second light characterized by a second wavelength, wherein the at least one light source is integrated with a second doorway structure separately disposed away from the first doorway structure for illuminating the first photoluminescent structure at a distance inside the vehicle.

2. The lighting system of claim 1, further comprising a second photoluminescent structure coupled to the second doorway structure and configured to convert the first light into a third light characterized by a third wavelength.

3. The lighting system of claim 2, wherein the second doorway structure comprises a grab handle coupled to a pillar of the vehicle.

4. The lighting system of claim 3, wherein the first wavelength is associated with a blue region of a light spectrum or an ultraviolet region of the light spectrum, and wherein the second wavelength and the third wavelength are each longer than the first wavelength.

5. The lighting system of claim 1, further comprising a light module configured to activate the at least one light source in response to a vehicle door being oriented in an open position.

6. The lighting system of claim 1, wherein the first doorway structure comprises a scuff plate.

7. A lighting system for a vehicle, comprising:
   a first photoluminescent structure coupled to a doorway structure; and
   a grab handle separately disposed away from the first photoluminescent structure and having an integrated light source that is configured to output a first light at a first wavelength, wherein a first portion of the first light is directed towards the first photoluminescent structure, which is configured to convert the first light into a second light characterized by a second wavelength.

8. The lighting system of claim 7, wherein the grab handle is coupled to a pillar of the vehicle.

9. The lighting system of claim 8, wherein a second portion of the first light is directed towards a second photoluminescent structure that is coupled to the grab handle and configured to convert the first light into a third light characterized by a third wavelength.

10. The lighting system of claim 9, wherein the first wavelength is associated with a blue region of a light spectrum or an ultraviolet region of the light spectrum, and wherein the second wavelength and the third wavelength are each longer than the first wavelength.

11. The lighting system of claim 10, wherein the grab handle comprises a light penetrable region that is combined with the second photoluminescent structure.

12. The lighting system of claim 7, further comprising a light module configured to activate the light source in response to a vehicle door being oriented in an open position.

13. The lighting system of claim 7, wherein the doorway structure comprises a scuff plate.

14. A lighting system for a vehicle, comprising:
    a grab handle;
    a light source integrated with the grab handle; and
    a first photoluminescent structure coupled to a scuff plate and configured to down convert light received from the light source.

15. The lighting system of claim 14, wherein the grab handle is coupled to a pillar of the vehicle.

16. The lighting system of claim 15, further comprising a second photoluminescent material coupled to the grab handle and configured to down convert light received from the light source.

17. The lighting system of claim 15, wherein the grab handle comprises a light penetrable region that is combined with the second photoluminescent structure.

18. The lighting system of claim 14, wherein the light source is configured to output one of a blue colored light and an ultraviolet colored light.

19. The lighting system of claim 14, further comprising a light module configured to activate the light source in response to a vehicle door being oriented in an open position.

* * * * *